(12) United States Patent
Baccus

(10) Patent No.: US 10,561,187 B1
(45) Date of Patent: Feb. 18, 2020

(54) DIGITAL DISPLAY TERMINAL APPAREL

(71) Applicant: Mary-Elizabeth Antoinette Baccus, Upper Marlboro, MD (US)

(72) Inventor: Mary-Elizabeth Antoinette Baccus, Upper Marlboro, MD (US)

(73) Assignee: Mary-Elizabeth Antoinette Baccas, Upper Marlboro, MD (US)

( * ) Notice: Subject to any disclaimer, the term of this patent is extended or adjusted under 35 U.S.C. 154(b) by 0 days.

(21) Appl. No.: 16/261,487

(22) Filed: Jan. 29, 2019

(51) Int. Cl.
| | |
|---|---|
| *A42B 1/00* | (2006.01) |
| *H04N 21/41* | (2011.01) |
| *A41D 1/00* | (2018.01) |
| *G06F 1/16* | (2006.01) |

(52) U.S. Cl.
CPC .............. *A42B 1/004* (2013.01); *A41D 1/002* (2013.01); *H04N 21/4126* (2013.01); *G06F 1/163* (2013.01)

(58) Field of Classification Search
CPC .... A42B 1/004; H04N 21/4126; A41D 1/002; A41D 1/005; A41D 27/085; G06F 1/162; G06F 1/163; G09G 2380/02
See application file for complete search history.

(56) References Cited

U.S. PATENT DOCUMENTS

| | | | | |
|---|---|---|---|---|
| 4,709,307 A | * | 11/1987 | Branom ................ | A41D 27/085 362/103 |
| 5,136,726 A | * | 8/1992 | Kellin .................... | A41D 27/08 2/115 |
| 5,912,653 A | * | 6/1999 | Fitch .................... | G09F 9/35 345/7 |
| 6,279,170 B1 | * | 8/2001 | Chu ...................... | G09F 3/208 2/246 |

(Continued)

FOREIGN PATENT DOCUMENTS

| | | | | |
|---|---|---|---|---|
| DE | 4408951 A1 | * | 9/1994 | ........... A41D 27/085 |
| JP | 2011036615 A | * | 2/2011 | |

OTHER PUBLICATIONS

Rodgers, Garron; "LED Screen on Graduaton Cap", Jun. 3, 2017; YouTube; <https://www.youtube.com/watch?v=xBCrXh5EHAw> (Year: 2017).*

*Primary Examiner* — John Villecco

(57) ABSTRACT

This invention generally relates to a system and method for digitally customizable apparel products. The present invention is a unique system and method for the digitalization of user's personal apparel to include graduation cap covers and display buttons. Specifically, this invention relates to a system and method that connects a removably attached digital visual display terminal containing light-emitting diodes (LED) cap covers, a removably attached LED display terminal display buttons, and display enabled computing devices to an encrypted wireless network that contains display-sharing interfaces, mirroring software and other programming systems for a new utility clothing that is functional, attractive, and complimenting to the user's personal style. Similarly, establishing a method for the invention to transmit the same images, media, and files through applications, websites, software programs, and other technological mechanisms. Conducted analysis of the proposed configurations consider the process of manufacturing such an innovative, superior quality, and versatile cap cover and display buttons.

4 Claims, 4 Drawing Sheets

(56) References Cited

U.S. PATENT DOCUMENTS

| | | | | |
|---|---|---|---|---|
| 6,895,261 B1* | 5/2005 | Palamides | H04B 1/385 | 455/100 |
| 9,116,667 B1* | 8/2015 | St. Louis | G06F 1/163 | |
| 9,241,526 B2* | 1/2016 | Goldberg | A42B 1/248 | |
| 9,489,016 B2* | 11/2016 | Malek | G06F 1/163 | |
| 9,857,968 B2* | 1/2018 | Khalid | H04B 5/0037 | |
| 10,198,034 B2* | 2/2019 | Ivanovic | G06F 1/163 | |
| 2003/0090598 A1* | 5/2003 | Johngren | A41D 27/085 | 348/838 |
| 2007/0033705 A1* | 2/2007 | Dickson | A42B 1/02 | 2/175.6 |
| 2012/0163269 A1* | 6/2012 | Shuster | G06F 3/0485 | 370/312 |
| 2012/0204307 A1* | 8/2012 | De Mattei | A41D 1/002 | 2/69 |
| 2014/0053315 A1* | 2/2014 | Pond | A41D 1/002 | 2/144 |
| 2014/0095618 A1* | 4/2014 | Larson | H04L 67/16 | 709/204 |
| 2016/0018846 A1* | 1/2016 | Zenoff | G09G 3/002 | 345/174 |
| 2016/0018978 A1* | 1/2016 | Zenoff | G06F 3/14 | 715/731 |
| 2016/0026423 A1* | 1/2016 | Zenoff | G06F 3/1407 | 345/156 |
| 2016/0048370 A1* | 2/2016 | Zenoff | G06F 3/1454 | 715/734 |
| 2016/0085294 A1* | 3/2016 | Weiner | G06F 1/1652 | 345/173 |
| 2016/0142863 A1* | 5/2016 | Lam | H04W 4/02 | 455/41.2 |
| 2016/0148558 A1* | 5/2016 | Ernst | G06F 1/1694 | 345/156 |
| 2016/0174646 A1* | 6/2016 | Burns | A42B 1/004 | 2/171.01 |
| 2016/0253952 A1* | 9/2016 | Cox | G09G 3/3208 | 345/184 |
| 2017/0205854 A1* | 7/2017 | Zenoff | G06F 1/163 | |
| 2017/0262884 A1* | 9/2017 | Miller | A41D 1/04 | |
| 2018/0000169 A1* | 1/2018 | Lee | A41D 27/08 | |
| 2018/0143797 A1* | 5/2018 | Levy | A41D 1/002 | |
| 2018/0241864 A1* | 8/2018 | Males | H04W 4/021 | |
| 2018/0373293 A1* | 12/2018 | Staton | G06F 1/1652 | |

* cited by examiner

Front (Left)
Inside (Right)

DIGITAL DISPLAY TERMINAL APPAREL

FIELD OF THE INVENTION

The present invention generally relates to a new utility clothing system and method for user customizable digitally enabled products that include display buttons and graduation caps. Specifically, the present invention relates to a system and method of decorative superior quality LED display terminal cap covers and display buttons that removably secure to all fabrics to include a standard graduation cap with the capabilities to harmoniously transmit display-sharing interfaces, mirroring software and other programming systems from an encrypted wireless network in conjunction with any display enabled computing devices. At the same time, considering the process of manufacturing such contemporary system of LED display terminal cap covers and display buttons.

BACKGROUND OF THE INVENTION

Historically, formal attire for graduation participants has remained relatively unchanged throughout time. Commonly, a standard "mortarboard" graduation cap and gown are uniform colors (e.g. primary school, intermediate school, secondary school and university). Graduation apparel currently consist of purchasing a gown and "mortarboard" cap. Graduates can choose to purchase decorative materials to decorate their cap to express their favorite quotes, childhood memories, collegiate experience, field of study, or any type of sentimental information. In general, graduation caps that include the decorative art or have a standard appearance are complemented by a tassel that is attached. The most interesting investigations of published designs, systems, methods, and software are cited in 1. U.S. Pat. No. 1953/9241526B2 in which an inexpensive, standard, and basically constructed graduation cap is designed.
2. U.S. Pat. No. 1929/1729778A in which an inexpensive, standard, and basically constructed display button is designed.
3. U.S. Pat. No. 1964/3134107 in which the "mortarboard" graduation cap is improved to be comprised of detachable components for sentimental purposes or cleaning.
4. U.S. Pat. No. 2008/7434166B2 in which a technique and procedure for providing an interactive management of several wireless devices to communicate graphical or video presentations while maintaining connectivity to a wireless display device that transmits a wireless module establishing capabilities to convert received data to mandatory format for desired viewing.
5. U.S. Pat. No. 2014/8898449B2 in which a procedure and process for initiating a wireless network point of entry while establishing an encrypted closed network for many computing devices that are all equipped with a display to observe the presentation.
6. U.S. Pat. No. 2016/9241526B2 in which a preselected or customized printed graduation cap topper that can be secured to a basic graduation cap without causing damage.
7. U.S. Pat. No. 2016/9426214B2 in which integrating presentation states harmoniously between numerous applications is published.
8. U.S. Pat. No. 2016/9468247B2 in which the "mortarboard" is altered to enable graduates to secure a display by way of attaching several different clips.
9. U.S. Pat. No. 2018/10075679B2 in which the invention related specifically to computer systems, methods, and software programs capable of generating a digital template for scoreboard displays.
10. U.S. Pat. No. 2018/10121455B2 in which an adjustable wristband will contain or have an attached flexible electronic display capable of displaying multiple functions.
11. U.S. Pat. No. 2018/10133979 in which chip-enabled card technology is combined with clothing garments.

The previously cited patents do not consider the multi purposeful superior quality LED display terminal cap cover and display button systems, methods, and software programs in its current art. Specifically, this invention relates to a system connects a removably attached LED display screen cap covers, a removably attached LED display screen display buttons, and display enabled computing devices to an encrypted wireless network that contains display-sharing interfaces, mirroring software and other programming systems that is functional, visually appealing, and complimenting to the user's personal style. Inexpensive modifications are now performed by graduates to express their individuality on top of a standard "mortarboard" cap. The fundamental design previously published is considered in the present artistic composition but has been expanded upon offering graduation cap toppers. In a like manner, foundational designs of the display button have consistently remained unchanged since 1929. Alternatively, the graduation cap topper permits graduates to decorate their caps without causing any physical damage or permanent alterations. Alternatively, the present invention has been composed with the previous embodiment considered in the process to manufacture exquisite LED display terminal cap covers and display button. Additionally, an interior easel back is considered in the present invention discontinuing a need for a separate stand. Moreover, the "Tassel Topper" invention requires graduates to remove the attached surface to change the desired image. The inventive publication for a method of installing several clips to the "mortarboard" portion of the standard graduation cap to display preferred decorative materials does not enable graduates to use magnets, adhesives, pins, or other adhesion methods. Similarly, the clip and topper inventions confine graduates to removing their cap to vary the image on top of the graduation cap. The previously evaluated inventions prohibit the possibility for graduates to change preferred images, presentations, and files from their display enabled computing devices.

The publication relating to wearable chip computing devices that are in contact with users' body is an advance invention, but the present invention systems and methods have capabilities regardless of user's body contact. This present invention improves the formerly cited patent to include a system and method that is removably attached to all fabrics and is surface compatible. The flexible electronic display that is fixed into or on a band invention specifically pertains to the user's wrist. The present invention does not restrict a durable electronic display to bands or writs. Equally, both publications would restrict users to body contact or a specific area of the body. The present invention relates to adhering to numerous different fabrics and balancing on any surface.

Presently, the prior publication referring to an interactive management system for several wireless devices to access video and graphic presentations is a substantial invention, but does not consider the present method, software, system, or manufacturing of superior quality LED display terminal cap covers or display buttons. The publication that established the invention of an encrypted access required closed network for display enabled computing devices is beneficial in the present invention. The previously mentioned technique is evaluated in the present invention to permit users high-level network security that protects the cap covers, display buttons, and display enabled computing devices. The present invention will protect users network security and personal information throughout the encrypted systems, programs, applications, and websites that connect to cap covers, display buttons and display enabled computing devices. The invention providing guidance on integrating presentation states concurrently between numerous applications can be expanded in the present invention to encompass cap covers and display buttons. The previously mentioned, technology in conjunction with the LED display terminal display buttons and cap covers will transmit the user specified presentation programs using the following technologies, but not limited to display-sharing interfaces, mirroring software, other programming systems, and will not be limited to the most common presentation applications. The digital template analyzed in a former patent publication only applies to scoreboards. The present invention is inclusive to all apparel and surfaces.

Against shortcomings discussed in the above patented technologies, systems, methods, and manufacturing, a design for a new utility apparel to include superior quality LED display terminal cap covers and display buttons was invented. The new presently invented electronic visual display terminal display buttons and cap covers is needed in the art of fashion and can be a customizable embellishment that is worn or attached to any fabrics and surfaces for all occasions. The present methods and systems are establishing a cost-effective, convenient, personalized, and non-damaging removably secured LED display terminal cap cover and display buttons. In an exemplary encompassment of the present invention, commencement participants will access an encrypted wireless network to utilize display-sharing interfaces, mirroring software, and other technological mechanisms to display synchronized data for a single user and/or multiple users from any preferred display enabled computing devices or manually uploading directly into the superior quality electronic visual display terminal cap covers and display buttons. Additionally, encompassments of the present invention grant inclusivity to family members, significant others, and friends all over the world by enabling users to permit data-sharing, mirroring display enabled computing device software, and other technological mechanisms synchronizing desired content that will be transmitted on digital visual display terminal cap covers and display buttons. Equally important, the present invention refers to display buttons and cap covers that create a wearable removably secured digital visual display terminal in an innovative opportunity to individualize the users casual and formal apparel at special occasions, daily life, or any preferred application.

SUMMARY OF THE INVENTION

Described herein are techniques, systems, and mechanisms for establishing user-enabled customizable digital visual display terminal products that will include, but not be limited to graduation caps and display buttons. Specifically, this invention relates to a system that wirelessly connects a superior quality electronic visual display terminal removable cap cover to several removable wireless superior quality electronic visual display terminal display buttons for a new utility clothing that is functional, attractive, and embellishing to the user's personal style. Correspondingly an encompassment of the present invention, is to empower graduates and loved ones during the graduation, after commencement has ended, and throughout all of life's special occasions. It is an object of the present invention, to provide an all-inclusive, multi-purpose, cost-efficient, quick, and removably secure user-enabled individualized LED display terminal cap covers and display buttons for those who will participate in commencement or just want to embellish their personal style.

Pursuant to the encompassment of the present invention, the electronic visual display terminal display buttons and cap covers give beloved individuals expanded possibilities to participate in celebratory festivities. In an exemplary encompassment the present invention, enables graduates, family members, and well-wishers to accent their apparel unprecedently, uniformly, and simultaneously in any location.

Pursuant to an encompassment of the present invention, said electronic visual display terminal cap cover and display button is configured to have exquisite technological capabilities for users. In an exemplary encompassment of the present invention, said substantially, all-inclusive, non-damaging, and removably secure LED display terminal display button and cap cover will contain unlimited customizable technological structure designs. The present invention may also include varying types of electronic visual display terminal s, Wi-Fi connectivity, cloud storage, flash memory card reader, flash drive port, website, software, applications, and will be compatible with all display screen enabled computing devices. The connection means may be further configured to allow users advance technological capabilities in a visually appealing, sleek, and relatively thin design of digital display terminal display buttons and cap covers.

The foregoing summary of the present invention with the preferred encompassment should not be constructed to limit the scope of the invention. It should be acknowledged apparent to one proficient in the art that the encompassment of the invention thus described may cultivate modifications without departing from the spirit and scope of the invention.

DETAILED SPECIFICATION

Figure 1:
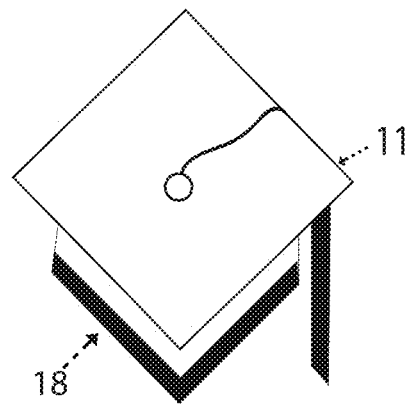
FIG. 1 shows a perspective view of a standard graduation cap as it is known in the present prior art.

The present invention generally relates to systems, methods, and technological mechanisms for user enabled customizable digital visual display terminal attire products that include but are not limited to graduation caps and display buttons. Specifically, this invention relates to a system that is encrypted allowing wireless transmitting of shareable multimedia files and mirroring software to superior quality electronic visual display terminal removable cap covers and display buttons for a new utility clothing that is functional, attractive, and complimenting to the users desired appearance.

Graduates choose to purchase decorative materials to embellish a standard "mortarboard" graduation cap to express their favorite quotes, childhood memories, collegiate experience, field of study, or any type of sentimental information. Presently encompassed designs of the invention consider family and friends of special occasions by enabling them to display the exact same multimedia files as one user or multiple users at the exact same time or any feasible time. A superior quality LED display terminal cap cover is specifically beneficial to graduation participants for several reasons. An electronic visual display terminal cap cover customized to graduates specified dimensions allows a new level of unique utility apparel that can be worn in multiple fashions or can be displayed on any surface. Heightening the graduation experience through a customizable, time efficient, cost-effective, and superior quality electronic visual display terminal cap cover. Furthermore, the present invention of the superior quality electronic visual display terminal display buttons in conjunction with an electronic visual display terminal cap cover empowers graduates, family members, and friends to all transmit the same presentation data harmoniously in any location. Equally important, the LED display terminal display buttons and cap covers can be utilized in various applications while maintaining exquisite functionality. The prestigious electronic visual display terminal display buttons and cap covers will be a stunning embellishment at family reunions, business gatherings, or at any fun festivities the user participates in.

In this manner, after commencement is over, the cap cover and display button may be continuously worn or stored in a memorable and professional manner. For instance, the decorative digital display and display buttons may be constructed in a way that permits users to utilize an easel back (with the back above and pulled out at an angle below). Incorporating digital visual display terminal cap covers and display buttons into future special occasions will allow users the ability to utilize their favorite technology to create a personalized celebration. One advantage in the present invention is that the simplicity of the system, method, and functionality enables both the cap cover and display button suitable for any festivity participants regardless of age.

Corresponding to an encompassment of the present invention, said connection means is configured to enable the users to attach the electronic visual display terminal 12 display buttons and cap covers 14 without causing damage to any fabrics 18 or surfaces 26. The user selected adhesion method is configured to be applied to the user selected fabric 18 that can be designed for embellishing the flat "mortarboard" graduation cap surface 11 by securing the present invention 10 using a variety of adhesion systems. An encompassment of the present invention, has configured the electronic visual display terminal 12 cap cover and display button 14 to have adhesion methods secured to the user selected apparel 18 to include the top of a standard graduation cap 11 by securing the LED display terminal digital 12 cap cover and display button 14 with attaching the corresponding adhesion methods 15 of the cap cover and display button 14. Connection means 14 may include, but are not limited to non-damaging adhesives, double-sided tape (e.g., Tesa® 4965), putty, Velcro connectors, and magnets (e.g., use of one or more ferromagnetic materials) attached to either the LED display screen 12 display button 10 and LED display screen 12 cap cover 10 or the preferred fabric 18. An additional encompassment of the present invention said electronic visual display terminal 12 display button and cap cover 10 is configured to be attached from the invented system 14 to fabrics 18 and surfaces 26 by way of the corresponding connections means 15. In an encompassment of the present invention, a connection means for securing the superior LED display terminal 12 display button and cap cover 10 have been configured to enable users to utilize an easel back 16 capabilities for surface applications 26. In an equivalent encompassment of the present invention, the connection means may be further configured to enable a tassel to be fixed in a moveable manner for maximum graduation participation. This is accomplished in the present invention by configuring a movement passage 17 to exist enabling users to attach a tassel. In an exemplary encompassment of the present invention, a passage way for the purpose of movement may be included on the superb LED display terminal display button enabling users to adorn their digital visual display terminal button with a miniature cap and tassel to signify degree completion. Aforesaid encompassments of the present invention provide maximum graduation festivity participation capabilities for anyone celebrating with graduates.

The innovative electronic visual display terminal 12 digital graduation cap covers and display buttons 10 as described herein may be comprised of technological abilities to include, but not limited to websites, applications, power supply components, mirroring software 13, encrypted communication network systems 23, presentation sharing software 13, cloud storage 23, Wi-Fi connectivity 23, flash drive port, flash memory card reader, and works in conjunction with any display enabled computing device 19. The exemplar electronic visual display terminal 12 cap cover and display button 10 will also encompass an encrypted wireless network 23 to ensure maximum functionality of communication media systems 13 and digital visual display terminal 12. Designs may be comprised of standard designs 10 with additional modifications. For example, LED display terminal 12 digital button and cap cover 10 designs may be comprised of user personalized technological components to guarantee functionality satisfaction. One of ordinary skill in the art would appreciate that there are numerous types of materials, technological components 12, and systems 13 that the decorative superior electronic visual display terminal 12 cap cover and display button 10 may be constructed from, and embodiments of the present invention are contemplated for use with any type of material.

Turning now to FIG. 1, shows a perspective view of the single host user's standard graduation cap attire is shown. FIG. 1, the single host user's desired attire application 18 is an unmodified flat surface 11 of a graduation cap is shown.

Figure 2:
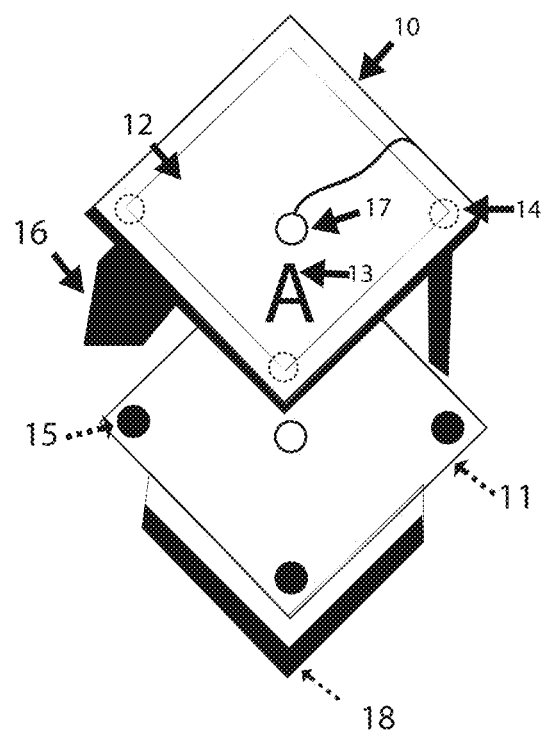
FIG. 2 shows a perspective view of a standard graduation cap with the superior quality electronic visual display terminal cap cover displaying user selected presentation data above, both illustrating connection means attached the "mortarboard" of said standard graduation cap and cap cover, in accordance with an encompassment of the present invention.

FIG. 2, shows a perspective view of a single host user's desired apparel application 18 is an unmodified flat surface graduation cap 11 with "mortarboard" adhesion methods positioned under the bottom surface of said cap 15 attached above is a superior quality electronic visual display terminal digital 12 cap cover 10 adhesion methods 14 displaying a single host user's selected presentation data 13, in accordance with an encompassment of the present invention, is shown.

Figure 3:
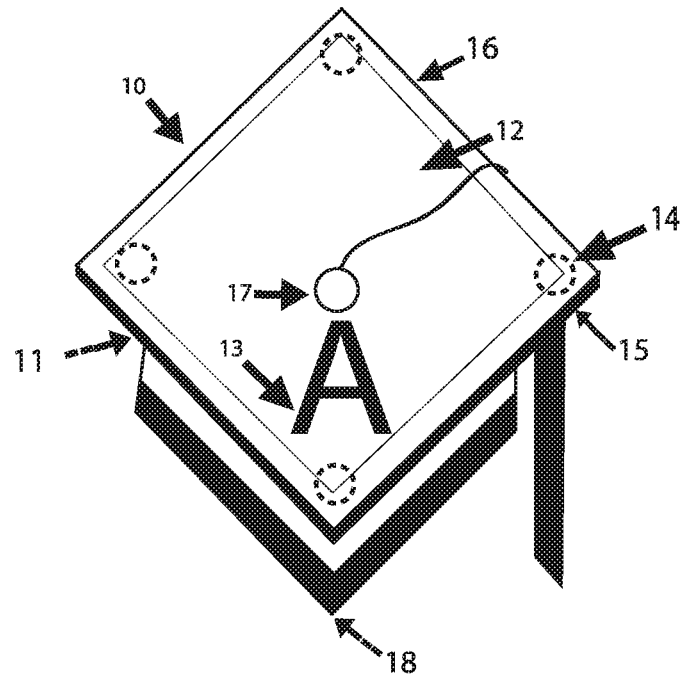
FIG. 3 shows a top perspective view of a superior quality LED display terminal cap cover transmitting user selected multimedia files while adhering to the users desired apparel, in accordance with an encompassment of the present invention.

FIG. 3, show a top perspective view of a superior quality LED display terminal 12 cap cover 10 demonstrating a single host user's selected multimedia files 13 while utilizing adhesion systems 14 on the users desired apparel 18 and attaching adhesion systems to the bottom 15 of said "mortarboard" surface in a manner that enables a tassel to be attached via a configured compartment 17 ensuring movement for maximum festivity participation and a concealed easel back 16 that will allow commemoration of the occasion in a visually appealing mode, in accordance with an encompassment of the present invention.

Figure 4:
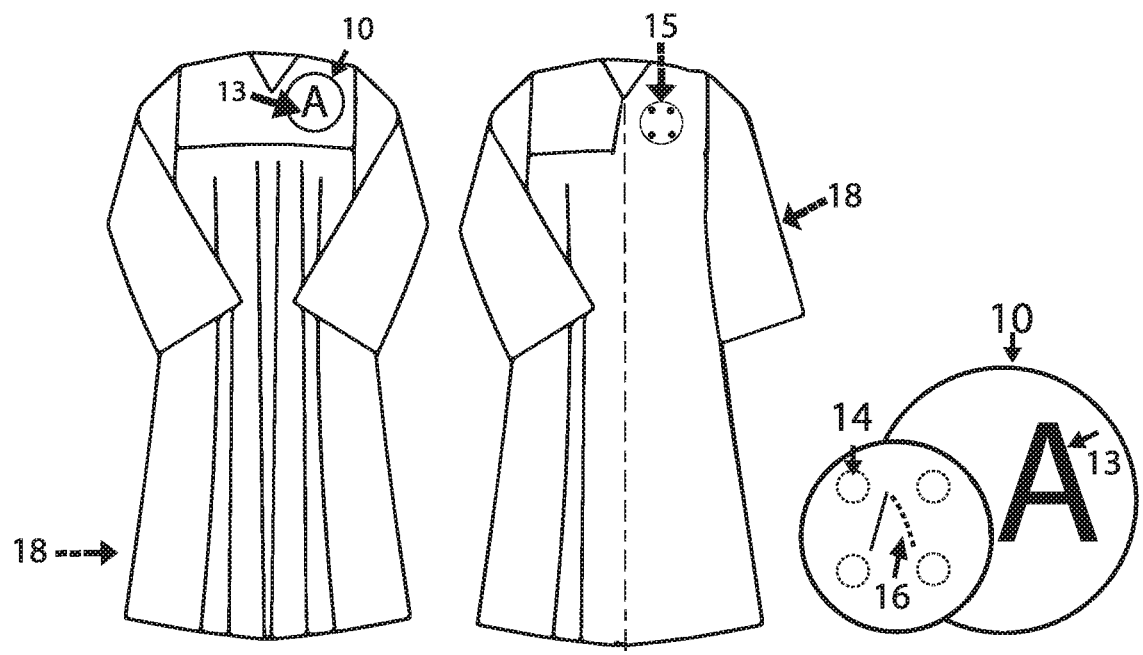
FIG. 4 shows a perspective view of a superior quality electronic visual display terminal display button transmitting user selected presentation data illustrating the adhesion methods and user selected apparel application, in accordance with an encompassment of the present invention.

FIG. 4, shows a perspective view of a superior quality electronic visual display terminal digital 12 display button transmitting 10 user selected presentation data 13 employing the adhesion methods 15 are applied to the user selected attire 18 as well as the adhesion methods 14 that establishes optimum adhesion functionality, in accordance with an encompassment of the present invention.

Figure 5:
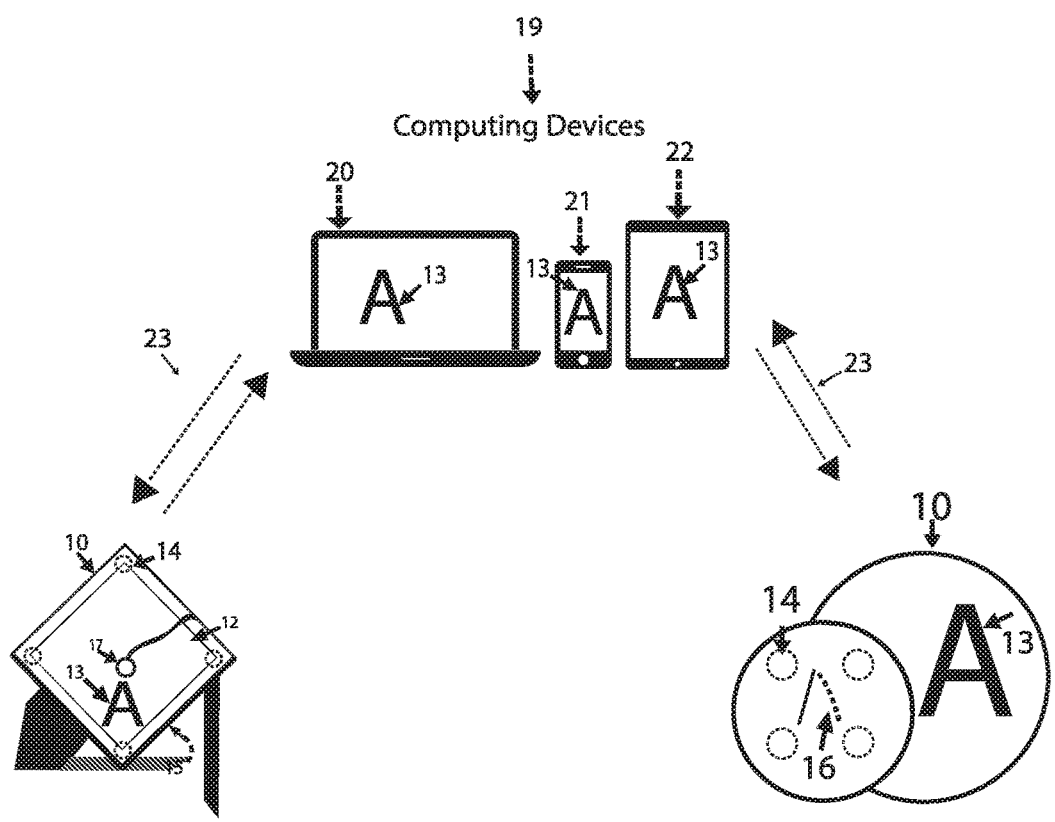
FIG. 5 is a flow chart illustrating one implementation of the superior quality LED display terminal cap cover, display button, and computing devices connecting to an established encrypted communication session via the closed wireless network enabling presentation sharing and mirroring software system capabilities that a hosting user selected to be displayed, in accordance with an encompassment of the present invention.

FIG. 5, is a flow chart representing a single host user's 24 implementation of the superior quality LED display terminal 12 cap cover 10, display button 10, and computing devices 19 connecting to an established encrypted communication session via the closed wireless network enabling presentation sharing and mirroring software system capabilities 23 that a single hosting user 24 selected to be displayed 13 on said digital visual display terminal 12, in accordance with an encompassment of the present invention.

Figure 6:
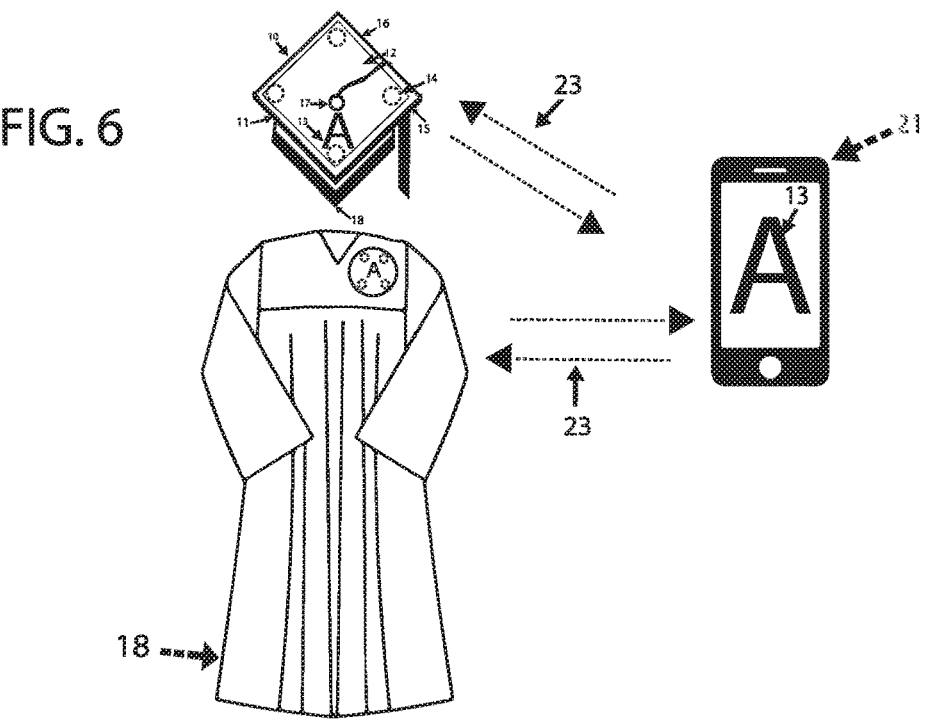
FIG. 6 is a flow chart illustrating the adhesion methods for a single host user's apparel application of a superior quality electronic visual display terminal cap cover and superior quality electronic visual display terminal display button connecting to an encrypted wireless network while utilizing mirroring software in conjunction with a display enabled computing device, in accordance with an encompassment of the present invention.
Figure 7:
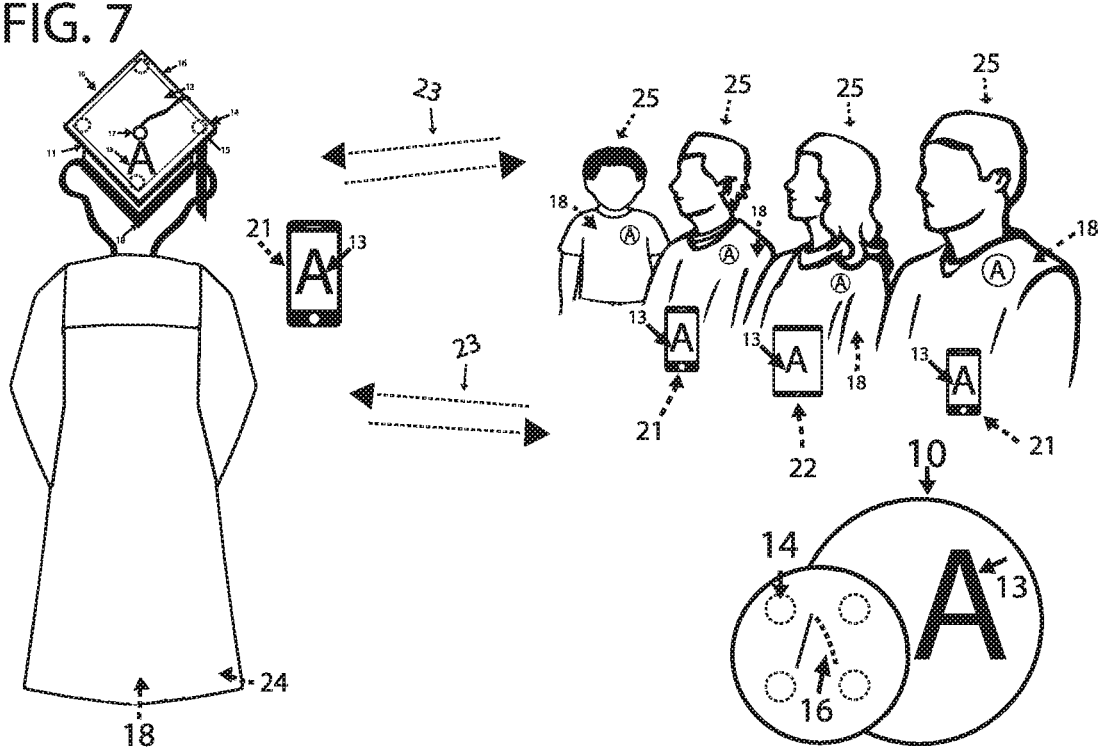
FIG. 7 shows an example of a host user transmitting display-sharing interface systems to connect with a plurality of user electronic visual display terminal display buttons and computing devices via an encrypted communication session on a virtual network server in different locations while adhering to various fabrics, in accordance with an encompassment of the present invention.

FIG. 6, is a flow chart representing a single host user's 24 implementation of the superior quality LED display terminal 12 cap cover 10, display button 10, and a mobile computing device 21 connecting to an established communication session via the closed wireless network enabling presentation sharing and mirroring software system capabilities 23 that a single hosting user 24 selected to be displayed 13 on said digital visual display terminal 12 employing the adhesion methods 15 are applied to the user selected attire 18 as well as the adhesion methods 14 that establishes optimum adhesion functionality in a manner that enables a tassel to be attached via a configured compartment 17 ensuring movement for maximum festivity participation and a concealed easel back 16 that will allow commemoration of the occasion in a visually appealing mode, in accordance with an encompassment of the present invention;

FIG. 7 is a flow chart representing the plurality of user electronic visual display terminal display buttons 10, mobile computing devices 21, and a tablet computer 22 via an encrypted communication session on a virtual network server 23 in different locations while adhering to various apparel fabrics 25 regardless of the user's age is shown. The current host user's implementation of the superior quality LED display terminal 12 cap cover 10 and a mobile computing device 21 shows the functionality between a host user 24 transmitting data via display-sharing interface and presentation mirroring systems 13 on the established closed wireless network to connect permitted users 25, display buttons 10, and varying computing devices 21 and 22, in accordance with an encompassment of the present invention is shown.

Figure 8:
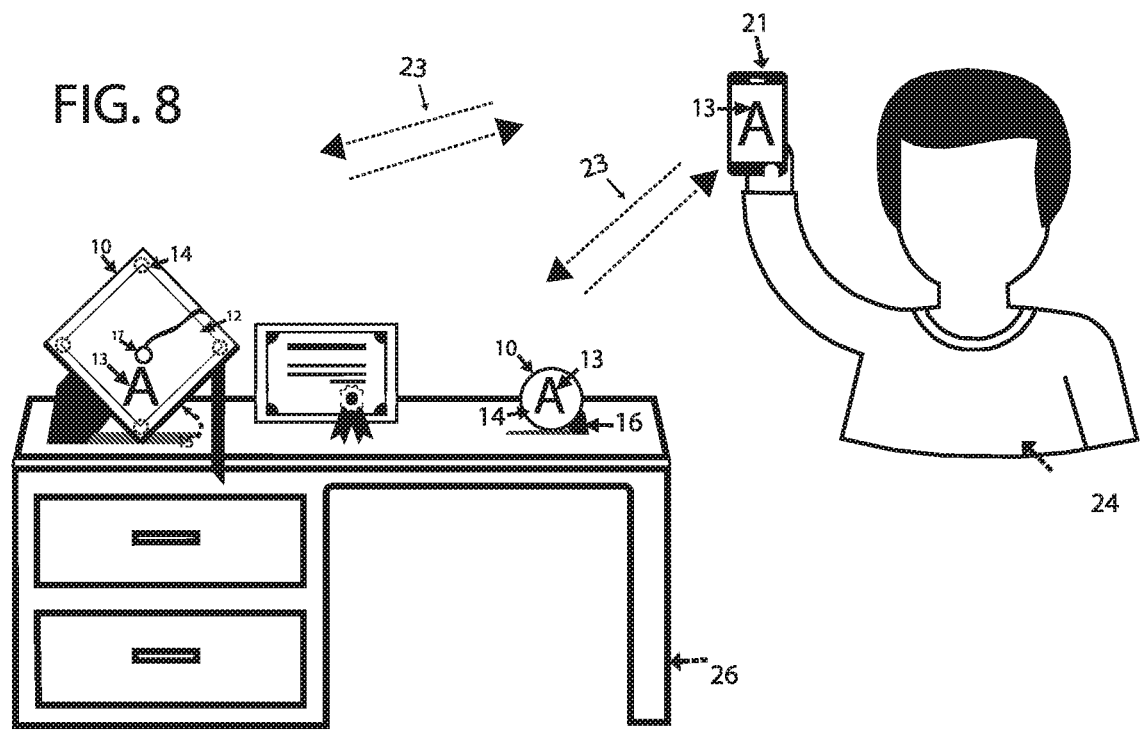
FIG. 8 shows a perspective view of a superior quality LED display terminal cap cover and superior quality electronic visual display terminal display button adhesion methods to the user's preferred surface while maintaining connectivity to an encrypted wireless network transmitting mirroring software, in accordance with an encompassment of the present invention.

FIG. 8, is a flow chart representing a single host user's 24 implementation of the superior quality LED display terminal 12 cap cover 10, display button 10, and a mobile computing device 21 connecting to an established communication session via the closed wireless network enabling presentation sharing and mirroring software system capabilities 23 that a single hosting user 24 selected to be displayed 13 on said digital visual display terminal s 12 simultaneously employing optimum adhesion functionality that enables an easel back 16 and a tassel to be attached via a configured compartment 17 commemorating any sentimental occasion in a visually appealing manner on a user selected surface 26, in accordance with an encompassment of the present invention.

While several exemplary encompassments are disclosed, still other advantageous encompassments of the present invention will become apparent to those skilled in the art from this comprehensive description. The invention is capable of myriad modifications in several obvious aspects, all without withdrawing from the spirit and scope of the present invention. Correspondingly, the drawings and descriptions are to be regarded as illustrative in nature and not restrictive.

The invention claimed is:

1. A display system attachable to and detachable from graduation attire comprising:
　an electronic display cap cover comprising:
　　a display disposed on a top side of the electronic display cap cover;
　　a first connection means disposed on a bottom side of the electronic display cap cover for attaching the electronic display cap cover to a top of a mortarboard cap of the graduation attire; and
　　an easel disposed on the bottom side of the electronic display cap cover to enable the electronic display cap cover to be displayed on a horizontal surface when detached from the mortarboard cap;
　an electronic display button comprising:
　　a display disposed on a front surface of the electronic display button;
　　a second connection means disposed on a back surface of the electronic display button for attaching the electronic display button to the graduation attire; and
　　an easel disposed on the back surface of the electronic display button to enable the electronic display button to be displayed on a horizontal surface when detached from the graduation attire; and one or more wireless computing devices connectable to both the electronic display cap cover and the electronic display button via an encrypted wireless communication network, wherein the one or more wireless computing devices transmit images, multimedia files, and presentations for display on the display of the electronic display cap cover and the display of the electronic display button.

2. The display system of claim 1 wherein the display of the electronic display cap cover and the display of the electronic display button are any one of an LED-backlit LCD (light emitting diode backlit liquid crystal display), LCD (liquid crystal display), LED (light emitting diode), or OLED (organic light emitting diode) displays.

3. The display system of claim 1 wherein the first and second connection means are selected from the group of: a hook and loop fastener, an adhesive, double-sided tape, and a magnet.

4. The display system of claim 1 wherein the electronic display cap cover, the electronic display button, and the one or more wireless computing devices all have a power supply.

* * * * *